United States Patent
Zhang et al.

(10) Patent No.: US 8,705,957 B2
(45) Date of Patent: Apr. 22, 2014

(54) OPTICAL LINE TERMINAL

(75) Inventors: Hua Zhang, Qingdao (CN); Xigui Wu, Qingdao (CN)

(73) Assignee: Hisense Broadband Multimedia Technologies Co., Ltd, Qingdao (CN)

(*) Notice: Subject to any disclaimer, the term of this patent is extended or adjusted under 35 U.S.C. 154(b) by 304 days.

(21) Appl. No.: 13/376,825

(22) PCT Filed: Jun. 9, 2010

(86) PCT No.: PCT/CN2010/000812
§ 371 (c)(1),
(2), (4) Date: Dec. 7, 2011

(87) PCT Pub. No.: WO2010/142140
PCT Pub. Date: Dec. 16, 2010

(65) Prior Publication Data
US 2012/0099857 A1    Apr. 26, 2012

(30) Foreign Application Priority Data

Jun. 11, 2009 (CN) .......................... 2009 1 0016348

(51) Int. Cl.
*H04B 10/08* (2011.01)
*H04B 10/06* (2011.01)

(52) U.S. Cl.
USPC ............... 398/25; 398/208; 398/38; 398/202; 398/209

(58) Field of Classification Search
USPC ............... 398/25, 208, 38, 202, 209
See application file for complete search history.

(56) References Cited

U.S. PATENT DOCUMENTS

| | | | | |
|---|---|---|---|---|
| 5,907,422 A * | 5/1999 | Ho et al. | ........................ | 398/209 |
| 6,597,485 B1 * | 7/2003 | Ikeuchi et al. | ................ | 398/192 |
| 6,864,724 B1 * | 3/2005 | Kim et al. | ..................... | 327/103 |
| 7,167,655 B2 * | 1/2007 | Olivier | .......................... | 398/202 |
| 7,414,234 B1 * | 8/2008 | Teeter et al. | ............... | 250/214 R |
| 2006/0263100 A1 * | 11/2006 | Uesaka et al. | ................. | 398/202 |

(Continued)

FOREIGN PATENT DOCUMENTS

| | | |
|---|---|---|
| CN | 1604209 | 4/2005 |
| CN | 101447830 | 6/2009 |

(Continued)

OTHER PUBLICATIONS

International Search Report and Written Opinion, issued in International Patent Application No. PCT/CN2010/000812, mailed Sep. 23, 2010, 8 pages.

(Continued)

*Primary Examiner* — Ken Vanderpuye
*Assistant Examiner* — Abbas H Alagheband
(74) *Attorney, Agent, or Firm* — Schwabe, Williamson & Wyatt, P.C.

(57) ABSTRACT

An optical line terminal (OLT) includes an optical receiving assembly and a processor (4). A current mirror (1), a current-voltage conversion circuit (2) and a switching circuit (3) are connected in sequence between the optical receiving assembly and the processor (4). An energy storage circuit connected to ground is connected between the switching circuit (3) and the processor (4). The optical receiving assembly generates a response current according to the optical signal received. The current mirror (1) processes the current and then transmits it to the current-voltage conversion circuit (2). The conversion circuit (2) converts the current into a voltage signal and transmits the voltage signal to the switching circuit (3). The switching circuit (3) transmits the voltage signal outputted by the conversion circuit (2) to the energy storage circuit. The voltage signal is sampled and held by the energy storage circuit and then outputted to the processor (4). The processor (4) monitors the average optical power of the voltage signal. The OLT can provide a more accurate detection of the average optical power of each burst signal pack in an upstream burst mode.

18 Claims, 8 Drawing Sheets

(56) References Cited

U.S. PATENT DOCUMENTS

2006/0284607 A1*  12/2006  Isobe ............................ 323/282
2008/0002973 A1*  1/2008   Yamabana et al. ............. 398/38
2008/0205906 A1*  8/2008   Murata ........................ 398/208
2010/0209100 A1*  8/2010   Uesaka et al. ................... 398/9

FOREIGN PATENT DOCUMENTS

| | | | | |
|---|---|---|---|---|
| CN | 101527597 | 9/2009 | | |
| CN | 101527599 | 9/2009 | | |
| CN | 101594184 | 12/2009 | | |
| JP | 2006304249 A | * 11/2006 | ............ | H04B 10/06 |

OTHER PUBLICATIONS

International Preliminary Report on Patentability, issued in International Patent Application No. PCT/CN2010/000812, mailed Dec. 12, 2011, 7 pages.

* cited by examiner

US 8,705,957 B2

OPTICAL LINE TERMINAL

CROSS REFERENCE TO RELATED APPLICATIONS

This application is a U.S. National Stage of International Application No. PCT/CN2010/000812, filed Jun. 9, 2010, designating the United States, and claiming the benefit of Chinese Patent Application No. 200910016348.9, filed with the Chinese Patent Office on Jun. 11, 2009 and entitled "Optical Line Termination", both of which is are hereby incorporated by reference in their entirety.

This application claims the benefit of Chinese Patent Application No. 200910016348.9, filed with the Chinese Patent Office on Jun. 11, 2009 and entitled "Optical Line Termination", which is hereby incorporated by reference in its entirety.

FIELD

The present invention relates to the field of optical communications and particularly to an optical line termination which can support functions of receiving and diagnosing a digital burst.

BACKGROUND

In recent years, people have an increasingly distinct demand for a high bandwidth, and their demand for a high bandwidth also has been fueled by the constant development of various value-added services, e.g., applications of video conferences, high-definition images, real-time games, IPTV, etc.

In general, modern communication networks can be divided into a core network and an access network, and the access network is referred figuratively to as "the last mile". Among numerous solutions for the existing market, the emergence of "Fiber To The Home (FTTH)" is considered as an ultimate solution to "the last mile" of a broadband access. Among numerous FTTH solutions, a Passive Optical Network (PON) has gained popular attention as a predominant optical access approach at present. In recent years, the PON technology has evolved from an Asynchronous Transfer Mode Passive Optical Network (APON) to a Broadband Passive Optical Network (BPON) and further to an existing Ethernet Passive Optical Network (EPON) and Gigabit-Capable Optical Network (GPON), and people pay increasing attention to the PON technology with a bandwidth above 1 Gbit/s, i.e., the EPON and the GPON, along with the popularization of an Ethernet technology in a Metropolitan Area Network (MAN) and the development of a broadband access technology.

The GPON has the maximum transmission rate up to 2.5 Gbps and supports a variety of services including Asynchronous Transfer Mode (ATM), Ethernet, Time Division Multiple (TDM), Community Antenna Television (CATV), etc., and it can be said the PON network technology which is the most functionally perfect at present is also a very economic and broadband oriented network access approach.

The GPON can better accommodate a broadband network access application due to its crucial advantages of, e.g., a higher rate, a higher access performance and network efficiency, strong flexibility and scalability, etc., which are particularly as follows:

1. High rate: the GPON can offer a wider range of data rates than the other passive optical network technologies, support a variety of symmetric and asymmetric line rates as well as the maximum rates up to 2.488 Gbps (for a downlink data stream) and 1.244 Gbps (for an uplink data stream) and satisfy a bandwidth demand of various existing and further possible services.

2. High efficiency: the GPON with an efficiency of 100% at a rate of 1.25 Gbps is apparently more attractive than the EPON with an efficiency of only 50%, and the GPON solution can provide a user with a higher bandwidth.

3. Strong scalability: the GPON can bear various types of user data in the protocols of both ATM and GFP. Both uplink and downlink frames thereof have a length of 125 µs. Broadcast is adopted in the downlink, and a Time Division Multiple Access (TDMA) approach is adopted in the uplink. The uplink frame is composed of multiplexed burst transmission timeslots and each includes transmission timeslots of one or more Optical Network Units (ONUs), and transmission of uplink data of the respective ONUs is indicated in an uplink bandwidth mapping field of the downlink frame, so that the GPON can bear an increasing number of various protocols and technologies, including a support of numerous TDM and data services and a support of new applications of, e.g., a storage area network, data video, etc.

A GPON system is composed of an Optical Line Termination (OLT), an Optical Distribution Network (ODN) and an Optical Network Unit/Optical Network Termination (ONT) in the same way as other PON systems. One of crucial technologies is to design a GPON OLT module for a GPON network to be deployed.

In the GPON system, it is of great importance for the Optical Line Termination (OLT) module to perform accurate and rapid reception of burst data in a burst data packet transmitted in the uplink. Since a stringent criterion was established in the GPON protocol and the dominant telecommunication operators proposed at the end of 2008 that a digital Received Signal Strength Indicator (RSSI) function shall be added to the GPON OLT module, thus resulting in a significantly increased difficulty of designing the GPON OLT module.

SUMMARY

Embodiments of the invention provide a new optical line termination device in order to improve the precision at which the optical line termination detects the average optical power of each burst signal packet in an uplink burst mode.

In view of this, the embodiments of the invention can be implemented in the following technical solutions:

An optical line termination includes an optical reception component and a processor, wherein a current mirror, a current-voltage conversion circuit and a switch circuit are connected sequentially between the optical reception component and the processor, and a grounded tank circuit is connected between the switch circuit and the processor, and wherein:

the optical reception component is configured to receive an optical signal, to generate from the optical signal a response current, and to output the response current;

the current-voltage conversion circuit connected with the optical reception component is configured to convert the response current output from the optical reception component to a voltage signal and output the voltage signal;

the switch circuit connected with the current-voltage conversion circuit is configured to be closed upon reception of an active trigger control signal at a control terminal thereof to receive the voltage signal output from the current-voltage conversion circuit and to output the voltage signal, wherein the trigger control signal is provided from the system side supervising the optical line termination;

the tank circuit connected with the switch circuit is configured to sample and hold the voltage signal output from the switch circuit and to output the voltage signal; and the processor connected respectively with the tank circuit and the switch circuit is configured to supervise the average optical power of the voltage signal output from the tank circuit.

Particularly the timing of high and low levels of the trigger control signal can be configured as follows:

the system side supervising the optical line termination sets the trigger control signal to an active status after the optical line termination receives the optical signal and in the length of the shortest active packet of the optical signal and maintains the active status until next input of the optical signal.

Preferably the current-voltage conversion circuit includes a high-speed operational amplifier chip, and a non-inverted input of the high-speed operational amplifier chip is connected with an output of the current mirror; an output of the high-speed operational amplifier chip is connected with a switch path of the switch circuit; and an inverted input of the high-speed operational amplifier chip is connected with a reference voltage.

Preferably a capacitor and a resistor connected in parallel are connected between the non-inverted input and the output of the high-speed operational amplifier chip in order to compensate an instability factor of circuit operation resulting from a parasitic capacitance arising from input pins of the high-speed operational amplifier chip.

Preferably the switch circuit includes a high-speed switch chip, and an input of the high-speed switch chip is connected with an output of the current-voltage converter; a switch path of the high-speed switch chip is connected between an output of the high-speed operational amplifier chip and the tank circuit; and a control terminal of the high-speed switch chip receives the trigger control signal transmitted from the system side.

Preferably the tank circuit includes a tank capacitor, and an anode of the tank capacitor is connected with the switch path of the high-speed switch chip and with an analog to digital converter interface of the processor; and a cathode of the tank capacitor is grounded.

Preferably the processor includes no analog to digital converter interface, and an anode of the tank capacitor is connected with a digital interface of the processor through an analog to digital converter.

Preferably the current mirror, the high-speed operational amplifier chip and the high-speed switch chip process the input signal at a speed below the length of the shortest active packet of the optical input signal in order to improve the precision at which the optical line termination detects the average optical power of the optical input signal. The length of the shortest active packet here refers to the duration of the shortest active packet of the optical input signal, i.e., the duration of the shortest active packet of an uplink burst signal received by the optical line termination, which is typically 300 ns for a GPON system and 1.5 µs for an EPON system.

Preferably a Printed Circuit Board, PCB, in the optical line termination is designed in stacked layers in order to improve the sensitivity with which the optical line termination receives the optical signal in an uplink burst mode, wherein the optical reception component, the current mirror, the current-voltage conversion circuit, the switch circuit, the tank circuit and the processor are arranged at a top or bottom layer of the PCB; and the PCB includes a power source layer, ground layers and signal layers sequentially from the top layer to the bottom layer, the signal layers at which high-speed signal lines and other crucial signal lines (typically a signal line with a specific irradiative strength) are arranged are sandwiched between two of the ground layers, and the power source layer is closely coupled with one of the ground layers, thereby effectively shielding irradiation and suppressing electromagnetic interference.

Particularly signal lines interconnecting the optical reception component, the current mirror, the operational amplifier circuit, the switch circuit, the tank circuit and the processor are crucial signal lines and arranged at the signal layers sandwiched between the two ground layers, thereby limiting signal irradiation to between the two ground layers; and a weakly irradiative non-critical signal line can be arranged at separate one of the signal layers which is adjacent to one of the ground layers.

The power source layer is preferably sandwiched between two of the ground layers, and for some optical line terminations with a strictly limited number of layers in the PCB, the power source layer can be sandwiched between one of the ground layers and one of the signal layers at which a weakly irradiative signal line is arranged, thereby accommodating a limited thickness of the PCB for the optical line terminations while suppressing as much electromagnetic irradiation resulting from a power source as possible.

In the invention, the optical line termination may be an optical line termination in a system of EPON or GPON.

The invention has the following advantages and positive effects over the prior art: the current mirror, the current-voltage conversion circuit, the switch circuit and the tank circuit can be additionally arranged between the optical reception component and the processor in the optical line termination according to the invention to thereby perform high-sensitivity reception of an optical input signal. The received optical signal can be sampled and held to thereby calculate and supervise accurately the average optical power thereof, particularly improve the precision at which the average optical power of each burst signal packet is supervised and measured in an uplink burst mode, thus providing the existing optical line termination with a burst supervision function. Real-time detection of these supervision quantities can assist a network administrator in locating a failure occurring over an optical fiber link and further simplify a maintenance effort and improve the reliability of the system.

Other features and advantages of the invention will become more apparent from the following detailed description of the embodiments of the invention upon being examined with reference to the drawings.

DETAILED DESCRIPTION

Figure 1:
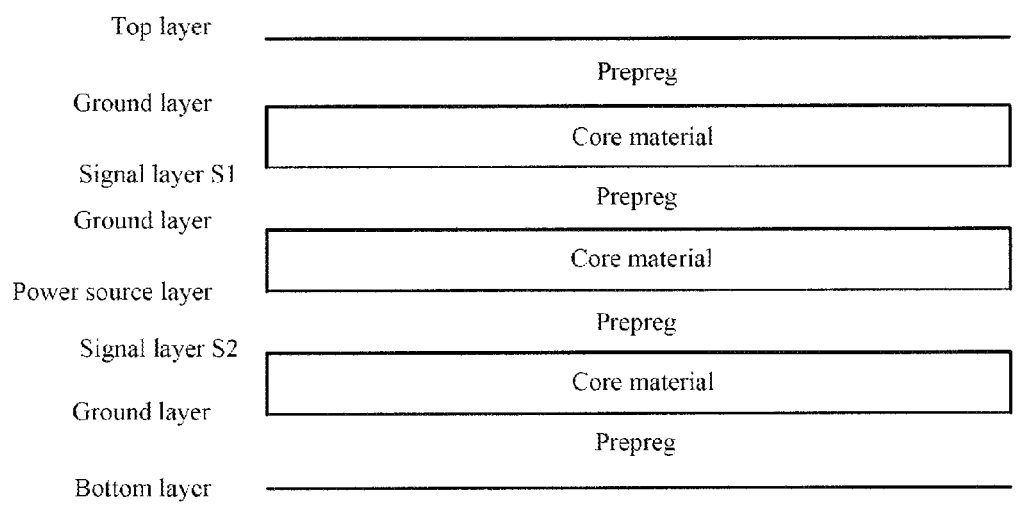
FIG. 1 is a schematic structural diagram of an embodiment of a PCB board designed in a stacked-layer structure of an optical line termination according to the embodiment of the invention.

Embodiments of the invention will be further detailed below with reference to the drawings.

In order to perform functions of receiving and diagnosing an optical signal in an uplink burst mode, an optical line termination according to the invention shall support supervision of received optical power in the burst mode for a specific period of time, typically in the length of the shortest active packet of the optical input signal, and technical difficulties encountered in designing thereof lie primarily in the following two aspects:

1. implementing high-sensitivity reception of an optical input signal in the uplink burst mode; and 2. implementing precision detection of the average optical power of each burst signal packet in the uplink burst mode.

For high-sensitivity reception of an optical signal in the burst mode, since a burst reception rate of 1.25 Gbps and a transmission rate of 2.5 Gbps are required to be achieved for an optical line termination of a GPON system (i.e., an GPON OLT), a transmission portion may pose a significant influence (i.e., crosstalk) upon the performance of a reception portion. Therefore from the perspective of primarily a radio line in a routing layout of a Printed Circuit Board (PCB), a line is routed as short as possible, a crucial signal is routed in a line at an inner layer with upper and lower layers thereof being shielded, and a power source layer is closely coupled with a ground layer.

For precision detection of the average optical power of a burst signal, an appropriate current mirror, a current-voltage conversion circuit, a switch circuit and a tank circuit shall be selected for the OLT dependent upon the length of the shortest active packet of the GPON system, i.e., the duration of the shortest active packet of an optical input signal or the duration of the shortest active packet of an uplink burst signal, to build a rapid detection circuit, where the current mirror receives a response current output from an optical reception component and processes and then outputs it to the conversion circuit for conversion of the current signal to a voltage signal, then the switch circuit is controlled to be closed for the system side to supervise the average optical power of the optical input signal, so that the OLT samples and holds the optical input signal between two occurrences of receiving a burst signal, and next a voltage stored in the tank circuit is transmitted to a processor for supervision and calibration of the optical input signal, thereby measuring precisely the average optical power in the burst mode. The duration is determined as required for the GPON system and, for example, typically 300 ns, but the invention will not be limited thereto.

An internal structure and an operation principle of an optical line termination of a GPON system in support of a high rate will be detailed below by way of an example.

In order to improve the sensitivity with which the OLT receives an uplink optical signal, particularly an optical signal in an uplink burst mode, the present embodiment proposes the following respective solutions from the perspective of designing a PCB:

1. The material of the PCB: the basic material and stacked layers of the PCB have a profound influence upon the performance of a product in the context of high-speed interconnection. Parameters determining the performance of the basic material of the PCB generally include a dielectric constant ($\in$), a loss factor (Df) and a Coefficient of Thermal Expansion (CTE). In the present embodiment, the board material of FR-4 or the material of ROGERS is preferably adopted.

2. A stacked-layer design: the PCB is designed in stacked layers, and it shall be noted that a signal layer is adjacent to a ground layer, the thickness of a dielectric between the signal layer and the adjacent ground layer is reduced as many as possible, and a power source layer is closely coupled with a ground layer. In the present embodiment, firstly respective branches of signal lines in the OLT are categorized so that a routed line in which a crucial signal is transmitted and a routed line in which a non-critical signal is transmitted are separately arranged respectively on different signal layers, where a signal layer at which a crucial signal line is arranged shall be sandwiched between two ground layers to thereby limit signal radiation effectively to between the two layers of grounds. Here a crucial signal refers particularly to a high-rate signal, signals (including a current signal and a voltage signal) processed by the optical reception component, the current mirror, the current-voltage conversion circuit, the switch circuit, the tank circuit and the processor and other strongly irradiative electronic signals, and a crucial signal line refers to a signal line in which a crucial signal is transmitted. A non-critical signal refers particularly to those weakly irradiative electronic signals other than a crucial signal, and a non-critical signal line refers to a signal line in which a non-critical signal is transmitted. A high-rate signal and other strongly irradiative signals are determined dependent upon a criterion preset for the system and typically refer to a signal at a higher or equal frequency than or to a preset frequency threshold which can be preset to 100 MHz, and a weakly irradiative signal typically refers to a signal at a lower frequency than the frequency threshold. A signal line in which the non-critical signal is transmitted is arranged at a separate signal layer which can be arranged adjacent to a ground layer. Secondly a power source layer is preferably arranged between two ground layers to suppress effectively Electro Magnetic Interference (EMI), thereby improving the performance of Electro Magnetic Compatibility (EMC). For some optical line terminations which are spatially limited and have the thickness of their internal PCBs stringently restricted, the power source layer can be arranged between a ground layer and a routed signal layer at which a non-critical signal travels to suppress as much electromagnetic irradiation resulting from a power source as possible.

3. Filtering: a filter capacitor is used for filtering near a power supply of each chip, and for a voltage-sensitive element, magnetic breads and a capacitor constitute a π-type filter circuit for filtering to thereby ensure operation of each chip at a stable voltage.

4. Free of an across-zone routed line: an optical signal reception processing circuit and an optical signal transmission processing circuit shall be arranged separately in respective zones in order to avoid a crosstalk and hence suppress interface of a transmitted signal to a received signal. For some inevitably across-zone signal lines, one of working solutions thereto is to arrange a bypass capacitor at the crossing.

5. An impendence design: a differential signal line with double-ended differential 100 ohms or a single-ended signal line with single-ended 50 ohms is adopted for transmission of a high-rate signal. That is, for transmission of a differential signal, the width of and the distance between two differential signal lines will be considered in order to attain a required 100±10% ohms relative to the ground; and for transmission of a high-rate signal in a single-ended signal transmission, the width of the signal line will be considered in order to attain a required 50±10% ohms relative to the ground.

A primary factor influencing the sensitivity lies in stacked layers and routed lines of the PCB, and a spatially limited OLT module can be arranged in a 8-layer board structure as illustrated in FIG. 1, where a crucial signal line is routed at a signal layer S1 arranged between two ground layers; a non-critical signal line is routed at a signal layer S2, and a power source layer is arranged between the layer and a ground layer; and finally a top layer and a bottom layer are considered at which electronic elements, of which the OLT module is built, are arranged, e.g., an optical reception component, a current mirror, an operational amplifier circuit, a switch circuit, a tank circuit, a processor, etc. Core materials adopted for the respective layers are preferably the board material of FR-4 or the material of ROGERS, and prepregs are arranged between the respective layers as illustrated in FIG. 1

Of course, those OLT modules for which there is no sufficient space can be designed in a board structure including a larger number of layers, e.g., 10 layers, etc., and at this time a ground layer can be arranged additionally between the power source layer and the signal layer S2 illustrated in FIG. 1 by sandwiching the power source layer between two ground layers to further suppress electromagnetic irradiation resulting from the power source. Thus irradiation interference resulting from a routed line at the signal layer S2 can also be shielded between the two layers of grounds to thereby further improve the EMC performance of the PCB. Of course, the PCB can alternatively be designed in a larger number of stacked layers, for example, by arranging a larger number of signal layers and ground layers, so long as the foregoing layout scheme is followed.

A routing layout of a PCB board of an OLT according to an embodiment of the invention may or may not follow the foregoing routing layout of the PCB board but preferably follows the foregoing routing layout of the PCB board.

Figure 3A:
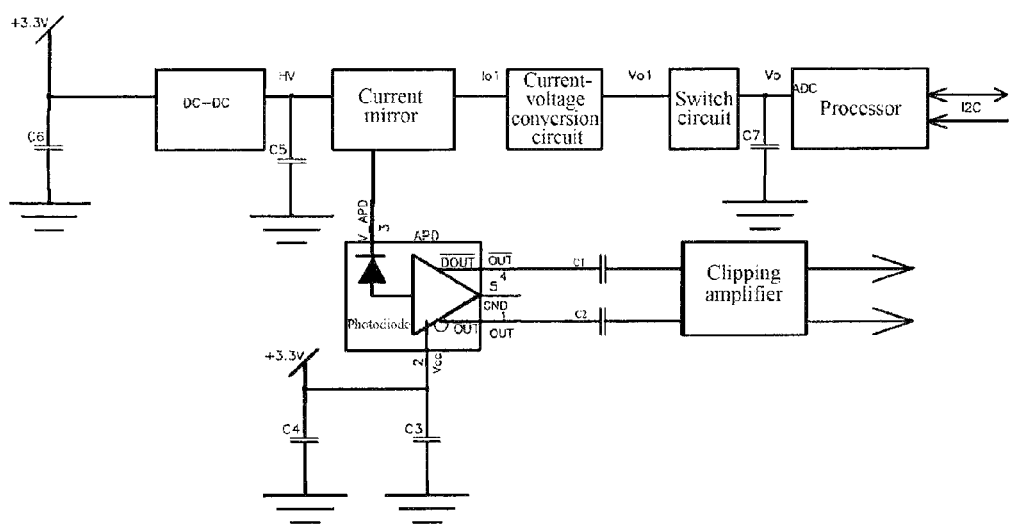
FIG. 3A and FIG. 3B are circuit principle block diagram of an embodiment of an optical input signal supervision circuit in the optical line termination according to the embodiment of the invention.

In an embodiment of the invention, a supervision circuit structure as illustrated in FIG. 3A is proposed to improve the precision at which an optical line termination detects the average optical power of each burst signal packet in an uplink burst mode.

Figure 2:
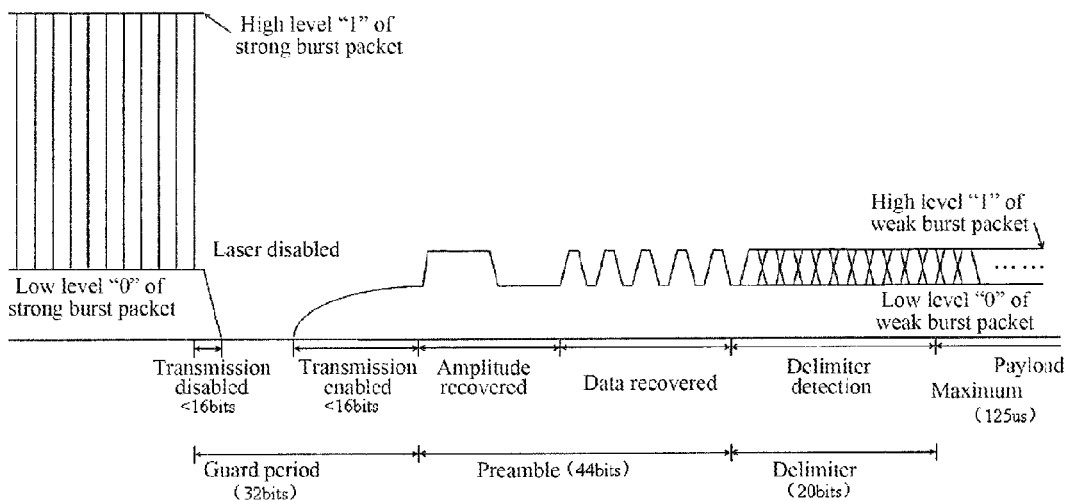
FIG. 2 is a schematic structural diagram of an uplink data packet in a GPON system according to an embodiment of the invention.

It is difficult to detect the average optical power required for an application in a burst mode at the reception side due to the TDMA approach adopted in a PON application. Since different ONUs arrive at the OLT over a variable distance and their optical modules transmit a strength-variable optical signal, the OLT receives a signal with power varying from one timeslot to another and consequently is susceptible to a misjudgment. FIG. 2 illustrates a physical-layer overhead of a GPON data packet as specified in the ITU-T G.984.2, which is the compulsively specified at an uplink rate of 1.244 Gbps to a 96-bit overall overhead composed of a 32-bit guard period of time, a 44-bit preamble period of time and a 20-bit delimiter period of time. The guard period of time refers an interval of time provided between two consecutive burst signal packets to avoid a confliction between the signal packets, the preamble refers to a preamble "101010 . . . " inserted before a burst signal packet to facilitate extraction of a phase for bit synchronization and received signal amplitude recovery, and the delimiter refers to a special type of code to indicate the starting of a burst signal packet and can be used for byte synchronization. In addition to these, the allowable maximum length of a Consecutive Identical Digit (CID) code is specified to 72 bits.

As can be apparent from FIG. 2, if the OLT receives a high-strength optical signal from an ONU at a short distance from the OLT and then a weak optical signal from an ONU at a long distance, then the OLT may fail to identity the weak signal by mistaking 1 for 0 because the high-strength optical signal was just received, and vice versa. In view of this, burst reception shall be performed, and a key of burst reception is to reestablish a decision threshold rapidly in several bits so that a reception circuit recovers properly the data against this threshold.

In order to detect accurately the average optical reception power in a burst mode, the present embodiment proposes the supervision circuit structure as illustrated in FIG. 3A.

Reference is made to FIG. 3A illustrating a schematic structural diagram of the OLT according to the embodiment of the invention, which includes an optical reception component and a processor between which a current mirror, a current-voltage conversion circuit and a switch circuit are connected sequentially while a grounded tank circuit is connected between the switch circuit and the processor, where:

The optical reception component is configured to receive an optical signal, to generate from the optical signal a response current, and to output the response current;

The current-voltage conversion circuit connected with the optical reception component is configured to convert the response current output from the optical reception component to a voltage signal and output the voltage signal;

The switch circuit connected with the current-voltage conversion circuit is configured to be closed upon reception of an active trigger control signal at a control termination thereof to receive the voltage signal output from the current-voltage conversion circuit and to output the voltage signal, where the trigger control signal is provided from the system side supervising the optical line termination;

The tank circuit connected with the switch circuit is configured to sample and hold the voltage signal output from the switch circuit and to output the voltage signal; and The processor connected respectively with the tank circuit and the switch circuit is configured to supervise the average optical power of the voltage signal output from the tank circuit.

The OLT further includes a Direct Current to Direct Current (DC-DC) conversion chip, and the optical reception component includes an Avalanche Photo Diode (APD).

Particularly the DC-DC conversion chip converts an input direct current power source, e.g., a direct current power source at +3.3 V illustrated in FIG. 3A, etc., into an operating voltage required for a circuit at a subsequent stage, e.g., an operating voltage required for the current mirror to power the current mirror, etc. Grounded capacitors C6 and C5 are connected respectively with an input and an output of the DC-DC conversion chip so that the capacitor C6 filters the direct current power source input to the DC-DC conversion chip and the capacitor C5 filters a direct current operating power source output from the DC-DC conversion chip to provide a stable and clear operating power source for the respective module circuits.

The OLT as illustrated in FIG. 3A is adopted in the embodiment of the invention to detect the average optical power of an optical signal under the following principle:

The APD in the optical reception component is connected with the current mirror and configured to receive through a photodiode therein an optical signal input over an optical fiber, to generate a response current Ipd corresponding to the optical signal and to transmit the response current Ipd to the current mirror;

The current mirror scales the response current Ipd output from the APD by a specific factor, e.g., a scaling-down factor of 5:1, etc., into a current Io1 and to output the current Io1 at an output thereof;

The current-voltage conversion circuit converts the current Io1 output from the current mirror into a voltage signal Vo1 with a specific amplitude and transmits the voltage signal Vo1;

A switch path of the switch circuit is enabled upon reception of an active trigger control signal at the control terminal and outputs the voltage signal Vo1 output from the current-voltage conversion circuit; and The tank circuit samples and holds the voltage signal Vo1 output from the switch circuit into a voltage signal Vo11 and outputs the voltage signal Vo11, and the processor supervises and calculates the average optical power of the voltage signal Vo11 output from the tank circuit.

The tank circuit is further connected with an Analog-to-Digital Converter (ADC) of the processor or with a data interface of the processor through a separate analog-to-digital converter.

Figure 5:
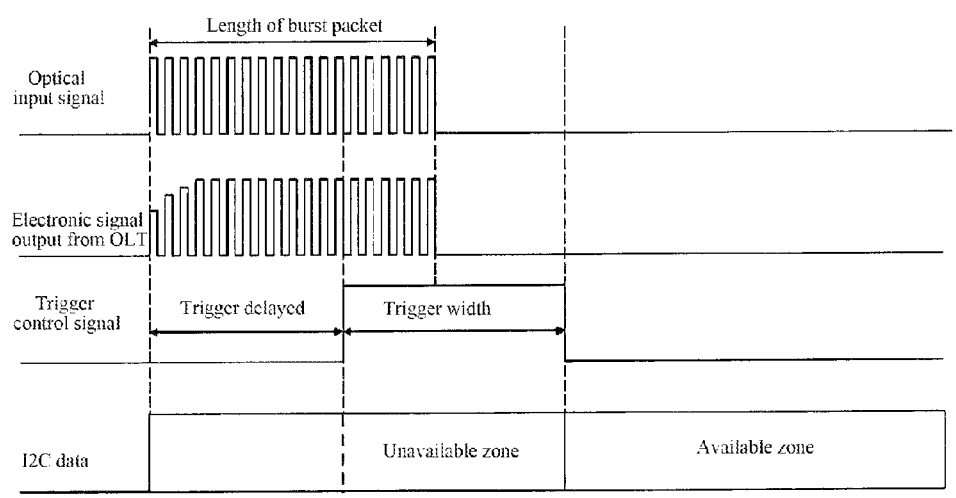
FIG. 5 is a timing diagram of a part of signals transmitted in the optical line termination according to an embodiment of the invention.

In order to enable the OLT to generate a digital received control quantity only upon reception of an optical signal, a control signal, i.e., the trigger control signal, shall be provided from the external system side controlling the OLT, to control the timing to close and open the switch circuit, where the trigger control signal is provided from the system side supervising the optical line termination. FIG. 5 illustrates the timings of crucial signals, e.g., the optical input signal, the trigger control signal, etc. The system side supervising the optical line termination outputs the trigger control signal, i.e., the active trigger control signal input to the OLT, after the optical line termination receives the optical signal and in the length of the shortest active packet (e.g., 300 ns, etc.) of the optical signal and further controls the switch circuit to be closed to transmit the voltage signal Vo1, output from the circuit-voltage conversion circuit, to the tank circuit for sampling and holding, thereby enabling the OLT to receive rapidly the optical signal, particularly a burst signal. In order to enable the tank circuit sample accurately the voltage signal Vo1 corresponding to each data packet of the input optical signal, the timing of the trigger control signal is such configured that the trigger control signal is set to an active status (e.g., jumps to a high-level status) after the OLT receives the optical input signal and in the length of the shortest active packet of the optical signal and maintained in the active status until next time the optical signal is input, that is, the trigger control signal is recovered to an inactive status, e.g., a low-level status, etc., between two inputs of the optical signal. The circuit path of the switch circuit is controlled by the trigger control signal kept in the active status for a period of time (typically longer than 1.5 µs) to be enabled for transmission of the voltage signal to the tank circuit. After charges stored on the tank circuit reach a stability value, the tank circuit finishes the sampling process and outputs the stored voltage signal Vo11 to the processor between two occurrences of a burst signal, so that the processor supervises and accurately calculates the average optical power of the optical signal in the burst mode. Thereafter the other function modules can fetch data of the optical power calculated and stored by the processor over an I²C bus to thereby perform corresponding functions. For example, a supervision master chip in the optical line termination can access the processor over the I²C bus and perform a digital Received Signal Strength Indicator (RSSI) function or like according to the fetched data of the optical power.

Upon next arrival of a burst signal, the switch circuit is closed again under the control of the trigger control signal (with the timing defined as above), and if the voltage signal Vo1 at this time is above the amount of charges Vo currently stored on the tank circuit, then the tank circuit continues with charging and energy accumulation further to the original charges until reaching the amplitude Vo1 of the voltage signal corresponding to the optical input signal this time and outputs the voltage signal Vo11 after reaching a stable amplitude at the end of charging, so that the processor supervises and calculates the average optical power of the voltage signal Vo11; and if the amplitude Vo1 of the voltage signal corresponding to the optical input signal is below the amount of charges Vo currently stored on the tank circuit, then the tank circuit discharges the stored charges until the amount of charges stored thereon Vo reaches the amplitude Vo1 of the voltage signal corresponding to the present optical input signal, and then outputs the voltage signal Vo11 after reaching a stable amplitude at the end of charging. In this devised approach, the average power of the optical input signal can be calculated accurately, and the sampling speed of the tank circuit can be improved so that it can be stabilized in a period of time as short as possible to the amplitude of the voltage signal Vo1 corresponding to the present optical input signal, thereby sparing a more abundant period of time for the processor to perform subsequent tasks of supervising the optical input signal, calculating the optical power, etc.

Figure 4A:
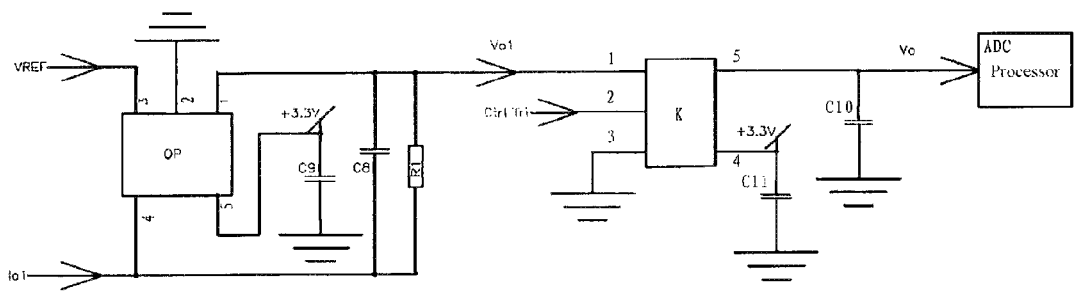
FIG. 4A is a circuit principle diagram of an embodiment of a current-voltage conversion circuit, a switch circuit and a tank circuit in the embodiment of the invention.

In the present embodiment, the current-voltage conversion circuit can be implemented with a high-speed operational amplifier chip OP combined with simple peripheral circuits, the switch circuit can be implemented with a high-speed switch chip K, and the tank circuit can be implemented with a tank capacitor C10, as illustrated in FIG. 4A, where:

A non-inverted input (i.e., a pin 4) of the high-speed operational amplifier chip OP is connected with an output of the current mirror to receive the current signal Io1 output from the current mirror; an inverted input (i.e., a pin 3) of the high-speed operation amplifier chip OP is connected with a reference voltage VREF, e.g., at +2.5V; and an output (i.e., a pin 1) of the high-speed operation amplifier chip OP is connected with a switch path of the high-speed switch chip K and is also connected with the non-inverted input of the high-speed operational amplifier chip OP through a resistor R1 connected in parallel.

Preferably a capacitor C8 connected in parallel with the resistor R1 is further connected across the output of the high-speed operational amplifier chip OP and the non-inverted input of the high-speed operational amplifier chip OP due to a instability factor, e.g., a lagging phase etc., of the operating circuit resulting from a parasitic capacitance arising from the input pins of the high-speed operational amplifier chip OP.

The high-speed operational amplifier chip OP outputs the voltage signal Vo1 with an amplitude of Vo1=VREF-Io1×R1 after current-to-voltage conversion. The amplitude of the reference voltage VREF and the resistance of the across-connected resistor R1 can be appropriately increased for the design purpose of improving the precision of detection.

Of course, peripheral circuits connected with the non-inverted input and the inverted input of the high-speed operational amplifier chip OP can be exchanged, and at this time the voltage signal Vo1 with the same amplitude as described above can be generated simply by additionally arranging an inversion circuit at the output of the high-speed operational amplifier chip OP. The inverted circuit can be implemented with an existing circuit structure for inverting a phase, e.g., an inversion circuit designed with a comparator.

Figure 3B:
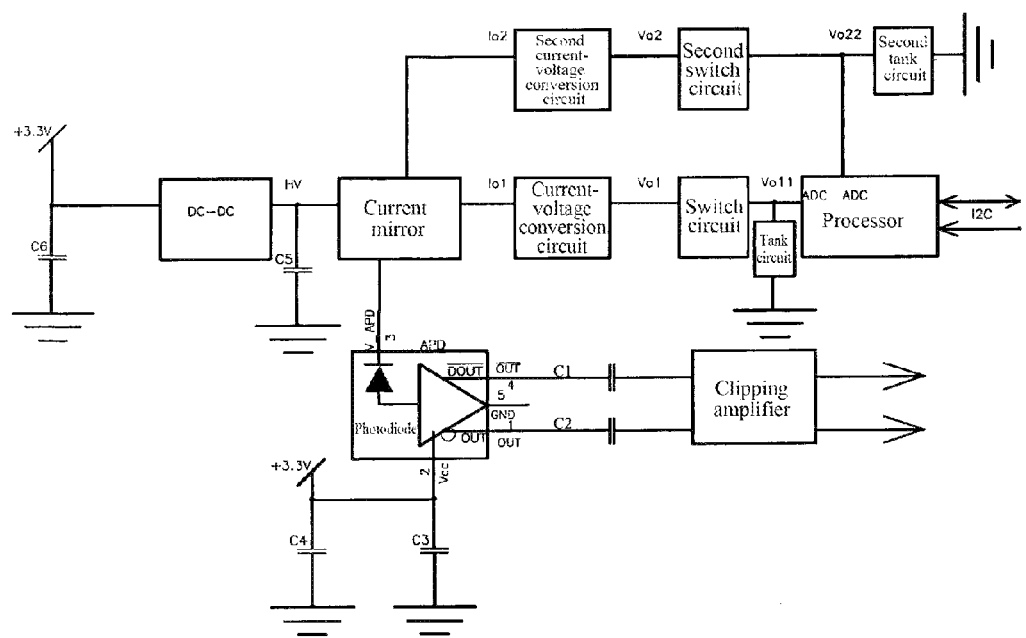

Preferably a branch for processing weak light can further be connected with the current mirror and the processor in order to perform a better process for strong and weak light, where the branch includes a second current-voltage conversion circuit and a second switch circuit connected in series and a grounded second tank circuit connected between the second switch circuit and the processor, as illustrated in FIG. 3B. In the present embodiment, the second current-voltage conversion circuit can be implemented with a high-speed operational amplifier chip OP combined with simple peripheral circuits, the second switch circuit can be implemented with a high-speed switch chip K, and the second tank circuit can be implemented with a tank capacitor C11 (not illustrated).

The OLT as illustrated in FIG. 3B is adopted in the embodiment of the invention to detect the average optical power of an input optical signal under the following principle:

The processor judges the strength of an input optical signal, and if the input optical signal is judged as a strong signal, then the processor controls the current mirror to scale down the current Ipd by a specific scaling-down factor of typically 5:1, into a current Io1 and outputs it to the current-voltage conversion circuit, and a subsequent processing flow is the same as described above and therefore a repeated description thereof will be omitted here. If the input optical signal is judged as a weak signal, then the processor controls the current mirror to scale down the current Ipd by a specific scaling-down factor of typically 10:1, into a current Io2 and outputs it to the second current-voltage conversion circuit; the second current-voltage conversion circuit converts the current Io2 output from the current mirror into a voltage signal Vo2 with a specific amplitude and transmits the voltage signal Vo2; a switch path of the second switch circuit is enabled upon reception of an active trigger control signal at a control terminal thereof to output the voltage signal Vo2 output from the second current-voltage conversion circuit; the second tank circuit samples and holds the voltage signal Vo2 output from the switch circuit into a voltage signal Vo22 and outputs the voltage signal Vo22; and the processor supervises and calculates the average optical power of the voltage signal Vo22 output from the tank circuit.

Figure 4B:
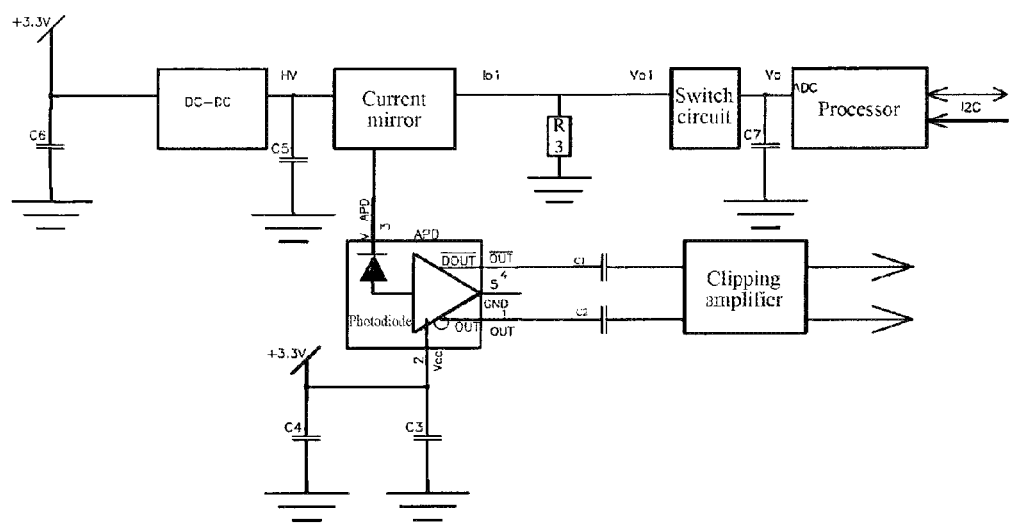
FIG. 4B is a circuit principle diagram of an embodiment of a current-voltage conversion circuit according to the embodiment of the invention.

Alternatively the current-voltage conversion circuit can be implemented in another form of a circuit structure than an operational amplifier chip so long as rapid current-voltage conversion can be performed, and the present embodiment will not be limited to the examples listed above. As illustrated in FIG. 4B, the current-voltage conversion circuit can be implemented with a grounded sampling resistor R3, where the signal is sampled directly by the sampling resistor R3 and then held by a switch K1 to thereby perform current-to-voltage conversion.

The tank circuit in the embodiment of the invention can be implemented with another conventional circuit element capable of charging and discharging than a capacitor.

The input of the high-speed switch chip K is connected with the output of the high-speed operational amplifier chip OP; the output of the high-speed switch chip K is connected with an anode of a tank capacitor C10 and with the processor through the capacitor C10, and the cathode of the tank capacitor C10 is grounded; and the control terminal of the high-speed switch chip K is connected with the system side to receive the trigger control signal output from the system side. The control terminal of the high-speed switch chip K receives the trigger control signal Ctri_Tri provided from the system side and controls the switch path thereof to be enabled when the trigger control signal Ctri_Tri is in an active status, e.g., a high-level status, etc., and further outputs the voltage signal Vo1 output from the high-speed operational amplifier chip OP to the tank capacitor C10 for sampling and holding. When the amount of charges Vo held on the tank capacitor C10 is above the voltage signal Vo1 output currently from the high-speed operational amplifier chip OP, the tank capacitor C10 discharges the excessive charges stored thereon to the current mirror through the switch path of the high-speed switch chip K and the high-speed operational amplifier chip OP, and the charges are discharged to the ground through a pull-down resistor connected at the output of the current mirror. In the present embodiment, the high-speed switch chip K shall be switched from "Off" to "On" in a period of time as short as possible and preferably implemented with an electronic switch which can be switched to an "On" status in 10 ns.

The tank capacitor C10 outputs the sampled and held voltage signal Vo to the ADC port of the processor, which in turn converts the analog voltage signal to a digital signal through an analog-to-digital converter therein and further calculates the average optical power to thereby perform a digital supervision task.

Of course, for a processor without any ADC port or a processor with a limited resource of ADC ports, the voltage signal Vo sampled and held by the tank capacitor C10 can firstly be transmitted to a separate analog-to-digital converter for conversion of the analog quantity into a digital quantity which is then transmitted to a digital interface of the processor to thereby perform supervision of the optical input signal by the processor.

In the present embodiment, the processor can be implemented with a single chip processor.

In order to improve the precision at which the OLT module supervises the average optical power of the optical input signal, the current mirror, the high-speed operational amplifier chip and the high-speed switch chip shall process the input signal at a speed below the length of the shortest active packet of the optical input signal, i.e., the duration of the shortest active packet of a burst signal.

In FIG. 3A and FIG. 3B, differential data outputs DOUT and OUT of the APD in the optical reception component are connected with a clipping amplifier LA respectively through DC-blocking capacitors C1 and C2 to amplify the amplitudes of received differential signals and then output them to the subsequent circuit.

In the present embodiment, for detection of the optical power at the transmission side of the OLT module, a transmission circuit of an optical signal can be implemented with a conventional laser driver circuit with Automatic Power Control (APC) in combined with a temperature compensation circuit, and further the average transmission optical power can be detected with the average of an optical current generated from a backlight diode.

Figure 6:
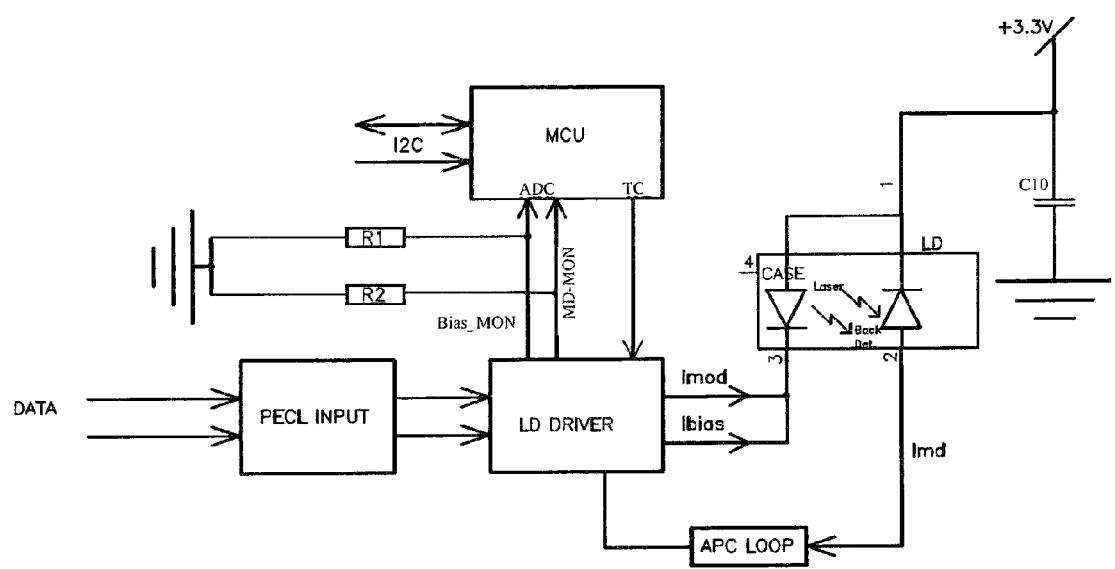
FIG. 6 is a circuit principle diagram of an embodiment of a transmission circuit in the optical line termination according to the embodiment of the invention.

In order to perform a consecutive transmission mode in the downlink in compliance with the standard SFF-8472, a key thereof is to drive and control a laser LD to transmit rapidly and accurately a data signal for transmission in compliance with the protocol of SFF-8472. In the present embodiment, a transmission circuit of the OLT module can be implemented in the structure as illustrated in FIG. 6, which includes a laser LD, a laser driver (LD driver), an Automatic Power Control (APC) loop for stabilizing the optical power, a temperature compensation circuit TC with a built-in stable extinction ratio and a supervision master chip MCU in compliance with the standard of SFF-8472.

Particularly two differential signal inputs of the laser driver (LD driver) are connected with data reception terminals DATA through a match circuit PECL INPUT and receive a transmission or reception control instruction transmitted from the office end. When there is data to be transmitted from the office end, the laser driver (LD driver) generates a bias current Ibias acting on a light emitting diode in the laser LD to drive the light emitting diode to emit light. Concurrently a data signal DATA transmitted from the office end is input to the laser driver (LD driver) through the match circuit to further generate a current Imod modulated onto the bias current Ibias, and the strength of light emitting from the light emitting diode in the laser LD is controlled by controlling the extent to which the light emitting diode is closed, thereby converting the data signal into an optical signal transmitted over an optical fiber.

In the laser LD, the photodiode generates a backlight current Imd with a corresponding magnitude in response to the strength of light emitted from the light emitting diode, and the backlight current Imd is filtered and shaped by a filter circuit and then fed back to the laser driver (LD driver) through the Automatic Power Control (APC) loop in order to control the emission light of the laser LD. A current signal Bias_MON equivalent to the bias current Ibias is converted into a voltage signal through pull-down resistors R1 and R2 and transmitted to the ADC port of the supervision master chip MPU for analog to digital conversion to thereby perform supervision and calibration of the bias current Ibias.

The use of the Automatic Power Control (APC) loop is required to keep the average optical power stable. The Automatic Power Control (APC) loop adjusts the bias current Ibias generated from the laser driver by a backlight current Imd generated from the backlight diode packaged in the laser LD so that the detected bias current Ibias will be equivalent to a reference current preset therein in a specific proportional relationship in order to provide constant output optical power.

The Automatic Power Control (APC) loop alone can stabilize an extinction ratio only at normal temperature, and an extinction ratio at high and low temperature shall be stabilized under the control of a stability compensation circuit TC by adjusting the current Imod for a constant extinction ratio in the industry-level I full temperature zone ranging from −40 to 85 degrees. The MCU supervises and calibrates the bias current according to the received current signal Bias_MON and supervises and calibrates the average optical power according to the received current signal MD_MON equivalent to the backlight current Imd.

Furthermore a 256-byte EEPROM accessed over an I²C bus shall be provided in compliance with the standard of SFF-8472, and in the present embodiment, a supervision master chip MCU with an EEPROM embedded therein and in support of 512-byte transmission can be used with a master I²C bus over which the processor at the reception side is accessed and which performs online control on a slave I²C bus.

Additionally in order to provide the optical link termination according to the present embodiment with more supervision functions, the optical link termination is preferably implemented with a processor capable of temperature detection and supply voltage detection in the present embodiment to thereby perform real-time supervision of temperature, a supply voltage and received optical power in a burst mode of the module. As compared with an OLT module without any supervision function in the prior art, detection of these supervision quantities can assist a network administrator in locating a failure occurring over an optical fiber link and further simplify a maintenance effort.

The form in which optical line termination according to the invention is embodied can be applicable to an optical line termination in a system of EPON, GPON, etc.

It shall be noted that the foregoing description is not intended to limit the invention, the invention will not be limited to the foregoing embodiments, and variations, modifications, additions or substitutions which can be made by those ordinarily skilled in the art without departing from the scope of the invention shall also be encompassed by the invention.

The invention claimed is:

1. An optical line termination, comprising an optical reception component and a processor, wherein a current mirror, a current-voltage conversion circuit and a switch circuit are connected sequentially between the optical reception component and the processor, and a grounded tank circuit is connected between the switch circuit and the processor, and wherein:
   the optical reception component is configured to receive an optical signal, to generate from the optical signal a response current, and to output the response current;
   the current-voltage conversion circuit connected with the optical reception component is configured to convert the response current output from the optical reception component to a voltage signal and output the voltage signal;
   the switch circuit connected with the current-voltage conversion circuit is configured to be closed upon reception of an active trigger control signal at a control terminal thereof to receive the voltage signal output from the current-voltage conversion circuit and to output the voltage signal, wherein the trigger control signal is provided from a system side supervising the optical line termination;
   the tank circuit connected with the switch circuit is configured to sample and hold the voltage signal output from the switch circuit and to output the voltage signal; and
   the processor connected respectively with the tank circuit and the switch circuit is configured to supervise an average optical power of the voltage signal output from the tank circuit.

2. The optical line termination of claim 1, wherein the system side supervising the optical line termination sets the trigger control signal to an active status after the optical line termination receives the optical signal and in the length of the shortest active packet of the optical signal and maintains the active status until next input of the optical signal.

3. The optical line termination of claim 1, wherein the current-voltage conversion circuit comprises a high-speed operational amplifier chip, and
   a non-inverted input of the high-speed operational amplifier chip is connected with an output of the current mirror, and with an output of the high-speed operational amplifier chip through a resistor; the output of the high-speed operational amplifier chip is connected with a switch path of the switch circuit; and an inverted input of the high-speed operational amplifier chip is connected with a reference voltage.

4. The optical line termination of claim 3, wherein a capacitor connected in parallel with the resistor is connected between the non-inverted input and the output of the high-speed operational amplifier chip.

5. The optical line termination of claim 1, wherein the switch circuit comprises a high-speed switch chip, and an input of the high-speed switch chip is connected with an output of the current-voltage conversion circuit; a switch path of the high-speed switch chip is connected between the output of the current-voltage conversion circuit and the tank circuit; and a control terminal of the high-speed switch chip is connected with the system side to receive the trigger control signal output from the system side.

6. The optical line termination of claim 5, wherein the tank circuit comprises a tank capacitor, and an anode of the tank capacitor is connected with the switch path of the high-speed switch chip and with an analog to digital converter interface of the processor or with a digital interface of the processor through an analog to digital converter; and a cathode of the tank capacitor is grounded.

7. The optical line termination of claim 3, wherein the current mirror, the high-speed operational amplifier chip and the high-speed switch chip process the input signal at a speed below the length of the shortest active packet of the optical input signal.

8. The optical line termination of claim 1, wherein a Printed Circuit Board, PCB, in the optical line termination is designed in stacked layers, and the optical reception component, the current mirror, the current-voltage conversion circuit, the switch circuit, the tank circuit and the processor are arranged at a top or bottom layer of the PCB; and the PCB comprises a power source layer, ground layers and signal layers sequentially from the top layer to the bottom layer, one or more of the signal layers at which a high-speed signal line is arranged are sandwiched between two of the ground layers, and the power source layer is closely coupled with one of the ground layers.

9. The optical line termination of claim 8, wherein signal lines interconnecting the optical reception component, the current mirror, the current-voltage conversion circuit, the switch circuit, the tank circuit and the processor and other strongly irradiative signal lines are arranged at the signal layer or layers sandwiched between the two ground layers, and the strongly irradiative signal lines refer to signal lines in which a signal at a higher or equal frequency than or to a preset frequency threshold is transmitted; and a weakly irradiative signal line is arranged at separate one of the signal layers which is adjacent to one of the grounded layers, and the weakly irradiative signal line refers to a signal line in which a signal at a lower frequency than the frequency threshold is transmitted.

10. The optical line termination of claim 8, wherein the power source layer is sandwiched between two of the ground layers or between one of the ground layers and one of the signal layers at which a weakly irradiative signal line is arranged.

11. The optical line termination of claim 4, wherein the current mirror, the high-speed operational amplifier chip and the high-speed switch chip process the input signal at a speed below the length of the shortest active packet of the optical input signal.

12. The optical line termination of claim 5, wherein the current mirror, the high-speed operational amplifier chip and the high-speed switch chip process the input signal at a speed below the length of the shortest active packet of the optical input signal.

13. The optical line termination of claim 6, wherein the current mirror, the high-speed operational amplifier chip and the high-speed switch chip process the input signal at a speed below the length of the shortest active packet of the optical input signal.

14. The optical line termination of claim 2, wherein a Printed Circuit Board, PCB, in the optical line termination is designed in stacked layers, and the optical reception component, the current mirror, the current-voltage conversion circuit, the switch circuit, the tank circuit and the processor are arranged at a top or bottom layer of the PCB; and the PCB comprises a power source layer, ground layers and signal layers sequentially from the top layer to the bottom layer, one or more of the signal layers at which a high-speed signal line is arranged are sandwiched between two of the ground layers, and the power source layer is closely coupled with one of the ground layers.

15. The optical line termination of claim 3, wherein a Printed Circuit Board, PCB, in the optical line termination is designed in stacked layers, and the optical reception component, the current mirror, the current-voltage conversion circuit, the switch circuit, the tank circuit and the processor are arranged at a top or bottom layer of the PCB; and the PCB comprises a power source layer, ground layers and signal layers sequentially from the top layer to the bottom layer, one or more of the signal layers at which a high-speed signal line is arranged are sandwiched between two of the ground layers, and the power source layer is closely coupled with one of the ground layers.

16. The optical line termination of claim 4, wherein a Printed Circuit Board, PCB, in the optical line termination is designed in stacked layers, and the optical reception component, the current mirror, the current-voltage conversion circuit, the switch circuit, the tank circuit and the processor are arranged at a top or bottom layer of the PCB; and the PCB comprises a power source layer, ground layers and signal layers sequentially from the top layer to the bottom layer, one or more of the signal layers at which a high-speed signal line is arranged are sandwiched between two of the ground layers, and the power source layer is closely coupled with one of the ground layers.

17. The optical line termination of claim 5, wherein a Printed Circuit Board, PCB, in the optical line termination is designed in stacked layers, and the optical reception component, the current mirror, the current-voltage conversion circuit, the switch circuit, the tank circuit and the processor are arranged at a top or bottom layer of the PCB; and the PCB comprises a power source layer, ground layers and signal layers sequentially from the top layer to the bottom layer, one or more of the signal layers at which a high-speed signal line is arranged are sandwiched between two of the ground layers, and the power source layer is closely coupled with one of the ground layers.

18. The optical line termination of claim 6, wherein a Printed Circuit Board, PCB, in the optical line termination is designed in stacked layers, and the optical reception component, the current mirror, the current-voltage conversion circuit, the switch circuit, the tank circuit and the processor are arranged at a top or bottom layer of the PCB; and the PCB comprises a power source layer, ground layers and signal layers sequentially from the top layer to the bottom layer, one or more of the signal layers at which a high-speed signal line is arranged are sandwiched between two of the ground layers, and the power source layer is closely coupled with one of the ground layers.

* * * * *